US006530849B2

(12) United States Patent
Peter

(10) Patent No.: US 6,530,849 B2
(45) Date of Patent: Mar. 11, 2003

(54) LOW COST, RESILIENT, SHEAR RESISTANT POLYURETHANE ELASTOMERS FOR GOLF BALL COVERS

(75) Inventor: Thomas H. Peter, Southbury, CT (US)

(73) Assignee: Uniroyal Chemical Company, Inc., Middlebury, CT (US)

(*) Notice: Subject to any disclaimer, the term of this patent is extended or adjusted under 35 U.S.C. 154(b) by 54 days.

(21) Appl. No.: 09/976,817

(22) Filed: Oct. 12, 2001

(65) Prior Publication Data

US 2002/0049099 A1 Apr. 25, 2002

Related U.S. Application Data

(63) Continuation-in-part of application No. 09/519,556, filed on Mar. 6, 2000, now Pat. No. 6,309,313, which is a continuation-in-part of application No. 09/396,264, filed on Sep. 15, 1999, now abandoned.

(51) Int. Cl.$^7$ .......................... A63B 37/12; C08G 18/48; C08G 18/32; C08G 18/76
(52) U.S. Cl. ................ 473/378; 264/271.1; 264/279; 264/279.1; 473/351; 473/365; 528/61; 528/64; 528/65; 528/76
(58) Field of Search ................ 473/378, 351, 473/365; 264/271.1, 279, 279.1; 528/61, 64, 65, 76

(56) References Cited

U.S. PATENT DOCUMENTS

| | | | |
|---|---|---|---|
| 3,147,324 A | 9/1964 | Ward | 264/254 |
| 3,784,209 A | 1/1974 | Berman | 473/377 |
| 3,979,126 A | 9/1976 | Dusbiber | 273/218 |
| 4,061,662 A | 12/1977 | Marans et al. | 560/26 |
| 4,123,061 A | 10/1978 | Dusbiber | 273/220 |
| 4,182,825 A | 1/1980 | Jackle | 528/44 |
| 4,288,577 A | 9/1981 | McShane, Jr. | 525/453 |
| 4,294,951 A | 10/1981 | Sugita et al. | 528/55 |
| 4,385,171 A | 5/1983 | Schnabel et al. | 528/491 |
| 4,555,562 A | 11/1985 | Lee et al. | 528/72 |
| 4,631,298 A | 12/1986 | Presswood | 521/163 |
| 4,688,801 A | 8/1987 | Reiter | 273/218 |
| 4,888,442 A | 12/1989 | Dunlap et al. | 560/352 |
| 5,006,297 A | 4/1991 | Brown et al. | 264/234 |
| 5,334,673 A | 8/1994 | Wu | 273/235 |
| 5,387,750 A | 2/1995 | Chiang | 528/52 |
| 5,459,220 A | 10/1995 | Kennedy | 528/44 |
| 5,599,874 A | 2/1997 | Singer et al. | 524/590 |
| 5,692,974 A | 12/1997 | Wu et al. | 473/377 |
| 5,703,193 A | 12/1997 | Rosenberg et al. | 528/44 |
| 5,733,428 A | 3/1998 | Calabria et al. | 264/134 |
| 5,792,008 A | 8/1998 | Kakiuchi et al. | 473/354 |
| 5,800,286 A | 9/1998 | Kakiuchi et al. | 473/365 |
| 5,849,168 A | 12/1998 | Lutz | 264/755 |
| 5,885,172 A | 3/1999 | Herbert et al. | 473/354 |
| 5,888,437 A | 3/1999 | Calabria et al. | 264/135 |
| 5,897,884 A | 4/1999 | Calabria et al. | 425/116 |
| 5,908,358 A | 6/1999 | Wu | 473/378 |
| 5,929,189 A | 7/1999 | Ichikawa et al. | 528/76 |
| 5,947,843 A | 9/1999 | Calabria et al. | 473/377 |

FOREIGN PATENT DOCUMENTS

| | | |
|---|---|---|
| GB | 1101410 | 1/1968 |
| WO | 98/37929 | 9/1998 |

OTHER PUBLICATIONS

Chen et al.; Comparison of the Dynamic Properties of Polyurethan Elasomers Based on Low Unsaturation Polyoxypropylene Glycols and Poly(tetramethylene oxide) Glycols; Polyurethanes Worlds Congress 1993; Oct. 10–13, 1993; pp. 388–399.

*Primary Examiner*—Rabon Sergent
(74) *Attorney, Agent, or Firm*—Daniel Reitenbach; Paul Grandinetti

(57) ABSTRACT

Disclosed herein is a golf ball comprising a core and a cover, said cover comprising a polyurethane elastomer comprising the reaction product of:

A) at least one diisocyanate monomer;
B) at least one polyol that is a homopolymer of propylene oxide having a molecular weight greater than 1000; and
C) at least one hydroxy or amine functional chain extender;

wherein the ratio of equivalents of chain extender plus polyol to equivalents of isocyanate is in the range of from about 0.6:1 to about 1.2:1, whereby said polyurethane elastomer possesses high shear resistance and good resilience.

6 Claims, No Drawings

LOW COST, RESILIENT, SHEAR RESISTANT POLYURETHANE ELASTOMERS FOR GOLF BALL COVERS

CROSS-REFERENCE TO RELATED APPLICATIONS

This application is a continuation-in-part of U.S. application Ser. No. 09/519,556, filed Mar. 6, 2000, now U.S. Pat. No. 6,309,313, which is a continuation-in-part of U.S. application Ser. No. 09/396,264, filed Sep. 15, 1999, abandoned.

BACKGROUND OF THE INVENTION

1. Field of the Invention

This invention relates to a low cost polyurethane elastomer having high resilience and shear resistance useful in the manufacture of golf ball covers.

2. Description of Related Art

Polyurethane elastomers are well known and can be formed by reacting a diisocyanate, e.g., diphenyl methane diisocyanate (MDI), toluene diisocyanate (TDI), isophorone diisocyanate (IPDI), and the like, with an organic polyol, e.g., polytetramethylene ether glycol (PTMEG), polyester or polycaprolactone glycol (PE), homopolymers and copolymers of ethylene oxide and propylene oxide (E/PO), and the like, and a chain extender, e.g., an aliphatic diol, such as, 1,4 butanediol (BD), or an aromatic diamine, such as, diethyltoluene diamine (DETDA). Catalysts, such as, triethylene diamine (TEDA), can be used to increase the reactivity of the components. Additional components, such as, UV stabilizers, antioxidants, dyes, antistatic agents, and the like, can be added, if desired.

U.S. Pat. No. 3,147,324 discloses a method of covering a golf ball with a liquid urethane polymer by suspending the golf ball center within a mold cavity and filling the mold cavity with the liquid polymer.

U.S. Pat. No. 3,979,126 discloses a solid plastic polyurethane golf ball. The golf ball comprises a polyether urethane prepolymer with a curing agent.

U.S. Pat. No. 4,061,662 describes a process which is effective in removing unreacted tolylene diisocyanate (TDI) from a polyisocyanate by bringing said polyisocyanate into contact with molecular sieves.

U.S. Pat. No. 4,123,061 discloses a polyurethane golf ball comprising a core and a cover at least one of which is a polyether urethane prepolymer with a curing agent selected from the group consisting of trifunctional polyols, tetrafunctional polyols and amine-type curing agents having at least two reactive amine groups.

U.S. Pat. No. 4,182,825 discloses capping hydroxy terminated polyethers with toluene diisocyanate, and substantially reducing the amount of unreacted toluene diisocyanate. When cured with 4,4'-methylene-bis-(2-chloroaniline), the cured products are said to have superior dynamic properties to the corresponding toluene diisocyanate capped polyethers with the usual unreacted toluene diisocyanate content. The cured products are said to be useful in fabricating industrial tires.

U.S. Pat. No. 4,288,577 discloses the reaction of a large excess of 1,4-butanediol with methylenebis (4-phenyl isocyanate) to give a mixture of urethanediols which is a suitable curing agent for isocyanate-terminated polyurethane prepolymers, especially prepolymers made from methylenebis (4-phenyl isocyanate) and polyols. It is said to be desirable to have a urethanediol mixture in which at least about 88 weight percent consists of the reaction product of 2 moles of 1,4-butanediol with 1 mole of the diisocyanate, about 10 weight percent of the reaction product of 3 moles of 1,4-butanediol with 2 moles of the diisocyanate, and no more than about 2 weight percent of 1,4-butanediol. The cured polyurethanes are said to have higher hardness and better overall physical properties than methylenebis-(4-phenyl isocyanate)-based polyurethanes cured with conventional commercial diols providing "hard" cured products.

U.S. Pat. No. 4,294,951 discloses rapidly cured polyurethane elastomers that are prepared by mixing a diphenylmethanediisocyanate based liquid prepolymer obtained from polytetramethylene ether glycol and an aliphatic diol at specified proportions, and a curing agent essentially containing said polytetramethylene ether glycol, diol and organometallic catalyst.

U.S. Pat. No 4,385,171 discloses removing unreacted diisocyanate from a polyurethane prepolymer reaction product mixture by co-distillation of the unreacted diisocyanate with a compound which is at least partially miscible with the prepolymer and which boils at a temperature greater than the boiling point of the diisocyanate. A highly efficient removal rate is said to be achieved in that the concentration of unreacted diisocyanate remaining in the reaction product mixture is generally less than about 0.1 percent, and in many cases less than about 0.05 percent, based on the weight of the prepolymer.

U.S. Pat. No. 4,555,562 discloses a polyurethane elastomer product formed by curing a mixture of an NCO terminated urethane prepolymer and a polyhydroxyalkylphosphine oxide.

U.S. Pat. No. 4,631,298 discloses mixtures of aromatic diamines, polyurethanes made therefrom, and processes for the preparation of the polyurethanes. The mixtures of aromatic diamines comprise a first aromatic diamine having a machine gel time of about 1 to 4 seconds in a 50,000 psi modulus RIM formulation reaction and the second aromatic diamine having a slower machine gel time of about 1.5 to 15 times that of the first aromatic diamine. The mixtures provide gel times of about 2.5 to 10 seconds, suitable for filling large molds such as automotive body panels. The aromatic diamine mixtures allow use of larger proportions of diamine to provide polyurethanes that are said to be rigid but not brittle at demold and have unexpectedly superior flexural modulus properties. The polyurethanes formed with the chain extender mixtures are also said to have flexural modulus superior to polyurethanes formed from either of the diamines individually U.S. Pat. No. 4,888,442 is directed to a process for reducing the free monomer content of polyisocyanate adduct mixtures wherein the adduct has an average isocyanate functionality of greater than about 1.8 which comprises treating the polyisocyanate adduct mixture in the presence of 2 to about 30 percent by weight of an inert solvent, based on the weight of the polyisocyanate mixture, in an agitated thin-layer evaporator under conditions sufficient to reduce the free monomer content of the polyisocyanate adduct mixture below that level which is obtainable in the absence of a solvent.

U.S. Pat. No. 5,334,673 discloses a golf ball made from a composition of a polyurethane prepolymer and a slow-reacting polyamine curing agent and/or a difunctional glycol. The slow-reacting polyamine curing agents and difunctional glycols are 3,5-dimethylthio-2,4-toluenediamine; 3,5-dimethylthio-2,6-toluenediamine; N,N'-dialkyldiamino diphenyl methane; trimethyleneglycol-di-p-aminobenzoate;

polytetramethyleneoxide-di-p-aminobenzoate; 1,4-butanediol; 2,3-butanediol; 2,3-dimethyl-2,3-butanediol; ethylene glycol; and mixtures thereof.

U.S. Pat. No. 5,387,750 discloses a method for producing an in-mold coated plastic article having an adherent coating wherein the coating composition is said to have improved surface coverage properties and a fast cure rate. The coating composition contains (a) a first component comprising at least one polyol having at least 4 hydroxyl groups and a viscosity at room temperature of 6000 cps or less; and (b) a second component comprising a solvent-free isocyanate prepolymer. The viscosity of the coating composition is 15000 cps or less at room temperature.

U.S. Pat. No. 5,599,874 discloses a thermoplastic polyurethane elastomeric seal composition comprising, by weight, about 90% to 99% thermoplastic polyurethane elastomer and about 1% to 10% fibers. Also, the thermoplastic polyurethane elastomer is derived from the reactants comprising: (i) a mixture of polyol and an aromatic chain extender in a molar ratio in the range of from about 40:60 to about 60:40 of butanediol glycol adipate to hydroquinone bis 2-hydroxyethyl ether, and (ii) 1,5 naphthalene diisocyanate present in a molar ratio in the range of about 50:50 to about 54.5:45.5 of 1,5 naphthalene diisocyanate to the said first mixture of polyol and an aromatic chain extender. After curing, the thermoplastic polyurethane elastomeric seal compound is said to have outstanding wear resistance and low compression set.

U.S. Pat. No. 5,692,974 relates to methods of using cationic ionomers in golf ball cover compositions and to golf balls which have covers and cores that incorporate urethane ionomers. The polyurethane golf ball cover is said to have improved resiliency and initial velocity through the addition of an alkylating agent such as t-butyl chloride to introduce ionic interactions in the polyurethane and thereby produce cationic type ionomers.

U.S. Pat. No. 5,703,193 discloses a process for reducing the amount of residual organic diisocyanate monomer in a polyurethane prepolymer reaction product mixture which comprises distilling the polyurethane prepolymer reaction product mixture in the presence of a combination of at least one inert first solvent with a boiling point below the boiling point of the residual organic diisocyanate monomer and at least one inert second solvent with a boiling point above the boiling point of the residual organic diisocyanate monomer, at a temperature which exceeds the vaporization temperature of the residual organic diisocyanate monomer and which is below the decomposition temperature of the polyurethane prepolymer.

U.S. Pat. No. 5,733,428 discloses a method and apparatus for making a golf ball having an encapsulated core or a non-treated core and a polyurethane cover of selected composition in which equipment is employed for aligning, centering and locating the core in relationship with the molding of the cover thereon.

U.S. Pat. No. 5,792,008 discloses a thread wound golf ball comprising a liquid center and a wound core having a thread rubber layer formed by winding thread rubber around the center and a cover enclosing the wound core. The cover is based on a non-yellowing thermoplastic polyurethane elastomer, and the difference in specific gravity between the center and the cover is 0.2 or less.

U.S. Pat. No. 5,849,168 discloses a method of applying a coating material to an outer surface of a golf ball, the method comprising molding a golf ball having an outer dimpled surface under a pressure greater than ambient pressure within a mold cavity; formulating a golf ball coating composition; introducing a sufficient amount of the coating composition into the mold cavity between the golf ball outer surface and an inner surface of the mold cavity to substantially surround and coat the entire outer surface of the golf ball; curing the coating composition upon the ball outer surface and removing the coated ball from the mold cavity.

U.S. Pat. No. 5,885,172 is directed towards a multilayer golf ball which comprises a core, an inner cover layer and an outer cover layer, wherein the outer cover layer comprises a thermoset material formed from a castable, reactive liquid, said outer layer having a thickness of less than 0.05 inch and said inner cover layer comprising a high flexural modulus material.

U.S. Pat. No. 5,908,358 discloses a golf ball cover produced from a composition comprising an isocyanate-functional prepolymer and a curing agent of a polyamine or glycol, and an organic compound having at least one epoxy group such as the diglycidyl ether of bisphenol A.

U.S. Pat. No. 5,929,189 discloses a golf ball that comprises a core and a cover enclosing the core. The cover resin is composed mainly of a thermoplastic polyurethane elastomer having an aliphatic diisocyanate component and exhibiting a tan δ peak temperature of not higher than −20° C. in viscoelasticity measurement.

U.K. Patent No. 1,101,410 discloses a prepolymer obtained by reacting a larger-than-usual excess of diisocyanate with glycol (either polyether or polyester type) and then removing substantially all of the unreacted diisocyanate from the crude prepolymer before the latter is contacted with a curing agent.

WO 98/37929 discloses a composition useful for golf ball covers that comprises a blend of a diisocyanate/polyol polyurethane prepolymer with a curing agent comprising a blend of slow-reacting diamine with a fast-reacting diamine such as dimethylthio 2,4-toluenediamine and diethyl 2,4-toluenediamine, respectively. A golf ball cover made with this composition is said to exhibit the characteristic feel and playability of a balata cover with superior durability characteristics (cut and shear resistance) which exceed those of a balata or ionomer cover.

Chen et al., *Polyurethane Worlds Congress* 1993; Oct. 10–13, 1993; pp. 388–399, discussed the dynamic mechanical properties of polyurethane elastomers based upon polyoxypropylene glycols having very low terminal unsaturation manufactured by using organometallic catalysts.

Polyurethanes are currently used in the manufacture of golf ball covers such as those on the Maxfli Revolution and the Titleist Professional. As indicated in U.S. Pat. No. 5,334,673, polyurethanes are advantageous in the production of golf ball covers because they have the feel and click of balata covered balls with much greater cut resistance. In addition, the polyurethanes are generally more resilient than balata, allowing balls to be made with both good feel and good distance. Resilience can be measured as percent rebound of a steel ball bouncing on a flat elastomer sample from a height of one meter, where the sample is at least 0.5 inch thick and is firmly mounted so as to prevent movement. A good golf ball cover material should have at least 40% resilience as measured on this test. Ionomer covers have good resilience, but are harder and do not give the click and feel of the polyurethane and balata covers.

Another advantageous feature of polyurethane formulations is shear resistance, as indicated in U.S. Pat. No. 5,908,358. Shear resistance measures the damage to a cover from the impact of a club with sharp grooves, which can tear away bits of the cover. In contrast, cut resistance measures the resistance to damage of the cover from a mishit shot, where the leading edge of the iron cuts directly into the cover. Shear resistance of polyurethane formulations varies, and the method of U.S. Pat. No. 5,908,358 is one method that can be used to improve the shear resistance of a polyurethane formulation.

Although polyurethane formulations are now known that give both shear resistance and acceptable resilience, while maintaining the click and feel of balata, the cost of such formulations is reasonable only for higher priced golf balls. Lower priced balls that require lower cost raw materials continue to be made with the less expensive ionomer covers. It would be advantageous if a polyurethane formulation could be prepared for significantly reduced cost without compromising shear resistance, resilience, and feel.

PTMEG, the use of which has been disclosed in a number of patents, is often chosen as the polyol in golf ball cover formulations. A paper on polyurethane elastomer selection, titled "What Polyurethane, Where?", and presented to the Polyurethane Manufacturer's Association in May, 1982, indicates that the three main polyol classes are high cost PTMEG ethers, low cost E/PO ethers, and esters. Esters are generally not suited to applications requiring resilience, since they have the lowest rebound. On the other hand, the high cost ethers, and particularly MDI ethers have high resilience, making them an acceptable choice. The low cost E/PO ethers have the lowest tear strength and abrasion resistance, and are generally used for low performance applications. This does not make them a prime candidate for golf ball cover evaluation, where shear and cut resistance are important. They have generally been dismissed as potential candidates.

The polyol can be used directly in the reaction mixture, or pre-reacted with diisocyanate to form a prepolymer before the addition of a chain extender, or both. While the prepolymer process is generally preferred, it is often desirable to use some of the polyol directly in the reaction mixture. This allows for adjustment of formulation hardness by adjusting the amount of polyol and chain extender in the formulation, and alleviates the need to use a different prepolymer when a different hardness in needed.

In preparing a polyurethane prepolymer, the organic diisocyanate monomer is employed in a stoichiometric excess of the diisocyanate monomer in relation to the polyol (an NCO:OH ratio greater than 1:1, usually about 2:1 or greater). The use of such an excess of diisocyanate monomer, however, results in an undesirable amount of unreacted volatile diisocyanate monomer in the prepolymer reaction product mixture. While some polyurethane processors have ventilation equipment capable of handling these volatile monomers, others have insufficient ventilation and require the use of a low free monomer prepolymer.

Several techniques have been described in the art as useful for reducing the amount of diisocyanate monomer in the prepolymer reaction product mixture. For example, U.K. Patent No. 1,101,410 and U.S. Pat. No. 4,182,825 describe a process for distilling the prepolymer reaction product under vacuum conditions to reduce the amount of diisocyanate. U.S. Pat. No. 4,061,662 describes a process for the removal of unreacted toluene diisocyanate from prepolymers by passing the prepolymer reaction product through a column containing a molecular sieve. U.S. Pat. No. 4,385,171 describes a method for the removal of unreacted diisocyanate from polyurethane prepolymers by codistilling the prepolymer reaction product with a compound that boils at a temperature greater than the boiling point of the diisocyanate. U.S. Pat. No. 4,888,442 describes a two-step process consisting of a first step of distilling the prepolymer reaction product to remove the bulk of the diisocyanate and then, in the second step, adding a solvent to the distilled prepolymer reaction product and passing the resultant mixture through an agitated thin-film evaporator. According to this patent, the vaporization temperature of the solvent should be exceeded under the conditions employed in the thin layer evaporator. U.S. Pat. No. 4,288,577 describes the removal of unreacted methylene bis(4-phenyl isocyanate) (MDI) via solvent extraction with hexane.

The procedures described above relate to reduction of such diisocyanate compounds as toluene diisocyanate (TDI), methylene-bis-(4-phenyl)isocyanate (MDI), and the like. Other diisocyanate monomers with high melting points, such as para-phenylene diisocyanate (PPDI), can be removed by the process of U.S. Pat. No. 5,703,193, which comprises distilling the polyurethane prepolymer reaction product mixture in the presence of a combination of at least one inert first solvent with a boiling point below the boiling point of the residual organic diisocyanate monomer and at least one inert second solvent with a boiling point above the boiling point of the residual organic diisocyanate monomer, at a temperature that exceeds the vaporization temperature of the residual organic diisocyanate monomer and that is below the decomposition of the polyurethane prepolymer.

SUMMARY OF THE INVENTION

It has now surprisingly been found that golf ball covers formulated from E/PO polyols, a diisocyanate monomer, and a curing agent have both excellent shear resistance and good resilience. The E/PO containing formulations cost less and have a lower viscosity, making RIM (reaction injection molding) or LIM (liquid injection molding) possible. A particularly preferred TDI system cured with DETDA can be made light in color and non-yellowing, allowing balls to be made without painting.

More particularly, the present invention is directed to a golf ball comprising a core and a cover, said cover comprising a polyurethane elastomer comprising the reaction product of:

A) at least one diisocyanate monomer;
B) at least one polyol that is a homopolymer of propylene oxide having a molecular weight greater than 1000; and
C) at least one hydroxy or amine functional chain extender;

wherein the ratio of equivalents of chain extender plus polyol to equivalents of diisocyanate is in the range of from about 0.6:1 to about 1.2:1, whereby said polyurethane elastomer possesses high shear resistance and good resilience.

In another aspect, the present invention is directed to a method of making a golf ball comprising a core and a polyurethane elastomer cover comprising molding around a pre-made core a mixture of:

A) at least one diisocyanate monomer;
B) at least one polyol that is a homopolymer of propylene oxide having a molecular weight greater than 1000; and
C) at least one hydroxy or amine functional chain extender;

wherein the ratio of equivalents of chain extender plus polyol to equivalents of diisocyanate is in the range of from about 0.6:1 to about 1.2:1, whereby said polyurethane elastomer possesses high shear resistance and good resilience.

The golf ball cover of this invention has excellent resilience and, surprisingly, excellent shear resistance, equal to that of the more expensive PTMEG urethanes currently available for use. The cost of the system is greatly reduced because of the use of the homopolymer of propylene oxide instead of PTMEG.

DETAILED DESCRIPTION OF THE INVENTION

As stated above, the present invention relates to a polyurethane elastomer comprising the reaction product of at least one diisocyanate monomer, at least one polyol that is a homopolymer of propylene oxide having a molecular weight greater than 1000, and at least one hydroxy or amine functional chain extender.

Diisocyanates that are suitable for use in the practice of the present invention include para-phenylene diisocyanate (PPDI); tolidene diisocyanate (TODI); isophorone diisocyanate (IPDI); 4,4'-methylene bis (phenylisocyanate) (MDI); toluene-2,4-diisocyanate (2,4-TDI); toluene-2,6-diisocyanate (2,6-TDI); naphthalene-1,5-diisocyanate (NDI); diphenyl-4,4'-diisocyanate; dibenzyl-4,4'-diisocyanate; stilbene-4,4'-diisocyanate; benzophenone-4,4'-diisocyanate; 1,3- and 1,4-xylene diisocyanates; 1,6-hexamethylene diisocyanate; 1,3-cyclohexyl diisocyanate; 1,4-cyclohexyl diisocyanate (CHDI); the three geometric isomers of 1,1'-methylene-bis(4-isocyanatocyclohexane) (abbreviated collectively as H12MDI); and the like; and mixtures thereof.

While almost any diisocyanate may be used, TDI and MDI are preferred because of their low cost. TDI is also preferred because its reactivity is well suited to curing with inexpensive, fast reacting amine chain extenders, such as, DETDA, using polyurethane processing techniques, such as, those described in U.S. Pat. No. 5,733,428 and U.S. Pat. No. 3,147,324. In faster RIM type systems, the faster MDI would normally be the diisocyanate of choice.

When TDI is used, it is often advantageous to use prepolymers where the unreacted monomer has been removed. Production of prepolymers having low amounts of free TDI is well known in the art and has been done commercially. TDI can be a mixture of the two main isomers of toluene diisocyanate, that is, the 2,4- and the 2,6-diisocyanate and, optionally, a small amount of the ortho isomers, the 2,3- and 3,4-isomers. Commercially, toluene diisocyanate is found as a 65:35, 80:20, or 99:1 isomer mix of the 2,4- and 2,6-isomers by weight and, optionally, from 0–5% by weight of the ortho isomers. An isomer mix is preferred that is within a range of from about 65–100% of the 2,4-isomer and the balance, i.e., about 0–35% being essentially the 2,6-isomer.

In the preparation of the polyurethane elastomers of the present invention, the diisocyanate monomers are preferably reacted with long chain (high molecular weight) polyols to produce prepolymers containing terminal isocyanate groups that are then chain extended with short chain (low molecular weight) amine or hydroxy functional chain extenders to form the polyurethane elastomers. The long chain, high molecular weight polyol provides flexibility and elastomeric properties to the resin, while the low molecular weight chain extender adds toughness and rigidity to the resulting elastomeric polymer. Alternatively, the diisocyanate monomer, polyol, and chain extender components can be reacted at the same time, or a portion of the polyol can be prereacted with the diisocyanate monomer, leaving the remaining polyol to be reacted together with the chain extender.

The polyols useful in the practice of the present invention are polyether polyols and are made by polymerization of propylene oxide. These cyclic ethers can be used individually or as mixtures or in successive fashion when making a polyether.

High molecular weight polyether polyols having a number average molecular weight of at least 1000 are used to prepare the prepolymer of the instant invention. A molecular weight in the range of from about 1500 to about 10,000 is preferred. However, the molecular weight of the high molecular weight polyol may be as high as 20,000 or as low as 1000. In addition, low molecular weight glycols and triols, with molecular weights ranging from 60–250, may be included.

The polyol or polyol blend used in the practice of the present invention is primarily an E/PO type, because E/PO's are low in cost, provide lower viscosity prepolymers than PTMEG or PE polyols, and yield surprisingly high shear resistant golf ball covers when used according to the invention. The choice of a particular E/PO polyol depends, in part, on the hardness desired, and on the level of free diisocyanate monomer acceptable. Lower molecular weight polyols will yield higher NCO contents and thus higher hardness in low free diisocyanate monomer prepolymers. On the other hand, it is known that a lower molecular weight will reduce resilience, particularly where the molecular weight is between about 300 and 1000, and to a lesser degree between about 1000 and 2000.

One alternative is to use one or more polyols having a molecular weight in the range of from about 60 to about 250 in combination with one or more high molecular weight polyols in order to achieve a desired hardness. Such low molecular weight polyols become part of the hard phase of the urethane elastomer and therefore do not reduce resilience to the same extent. Examples of these polyols include ethylene glycol, propylene glycol, propanediol, butanediol and isomers thereof, diethylene glycol, triethylene glycol, tetraethylene glycol, dipropylene glycol, tripropylene glycol, tetrapropylene glycol, trimethylolpropane (TMIP), ethoxylated TMP, propoxylated TMP, pentaerythritol, ethoxylated pentaerythritol, propoxylated pentaerythritol, PTMEG oligomers, and the like.

The polyol or polyol blend may be further blended with another polyol to provide some of the characteristics of the other polyol. For example, some PTMEG polyether may be added to improve weathering (oxidation) characteristics, or polyester may be added to the system to improve abrasion resistance.

The polyols used in the practice of the present invention have a nominal hydroxyl functionality of about 1.7 to about 6, preferably about 2 to about 4. While polyols with functionality of about 2 are generally expected to have improved physical properties, excellent shear resistance can be obtained with higher functionality as well.

After reacting the diisocyanate with the polyol, the unreacted diisocyanate may, if desired, be reduced to less than about 1% and, preferably, to less than about 0.1%, of the reaction mixture. Methods for accomplishing this are well known in the art. One such method is detailed in U.S. Pat. No. 4,182,825. Removal of the unreacted diisocyanate results in a prepolymer that is safer to handle owing to the reduced risk of exposure to the vapor and, surprisingly, results in a final cured part that has substantial improvements in resilience and clarity. Such removal can be effected by distillation, generally conducted in agitated thin-film distillation equipment, also known as thin film evaporators, wiped film evaporators, short-path distillers, and the like.

Preferably, the agitated thin-film distillation equipment comprises internal condensers and vacuum capability. Two or more distillation units can, optionally, be used in series. Such equipment is commercially available, e.g., Wiped Film Stills from Pope Scientific, Inc.; Rototherm "E" agitated thin-film processors from Artisan Industries, Inc.; Short-Path Evaporators from GEA Canzler GmbH & Co.; Wiped-Film Evaporators from Pfaudler-U.S., Inc.; Short Path Distillers from UIC Inc.; Agitated Thin-Film Evaporators from Luwa Corp.; and SAMVAC Thin Film Evaporators from Buss-SMS GmbH.

In general, the distillation is carried out in a conventional manner. Use of distillation equipment, such as, wiped film evaporation and vacuum distillation, are familiar to those skilled in the art. See, e.g., Laboratory Experiments in Organic Chemistry, by Adams et al, Sixth Edition, Macmillan.

The actual temperature and pressure conditions of the distillation should be such that the vaporization point of the diisocyanate monomer is exceeded without decomposing the polyurethane prepolymer. The actual temperature and pressure can vary, therefore, and are dependent upon the diisocyanate monomer being removed, the polyurethane prepolymer, other components of the polyurethane prepolymer reaction product mixture, etc. For example, for PPDI and TDI monomers, temperatures can range from about 100° C. to about 160° C. and the pressure can range from about 0.01 to about 2 mm Hg. If the monomer is MDI, the distillation temperature can range from about 120° C. to about 175° C. and the pressure can range from about 0.002 mm Hg to about 0.5 mm Hg.

The distillation can be carried out batchwise, semi-continuously, or continuously. Usually, short residence times are preferable. Preferred residence times can range from about 10 seconds to about 5 minutes.

Free NCO content can be determined by a procedure similar to that described in ASTM D1638-70, but employing tetrahydrofuran as the solvent.

The chain extender, employed in the practice of the present invention is a hydroxy or amine functional chain extender. The low molecular weight polyols described above are useful as chain extenders. The preferred amine functional chain extender for use with TDI when using the processes of U.S. Pat. No. 3,147,324, U.S. Pat. No. 5,733, 428, or WO 98/37929 is an alkylated aromatic diamine, preferably an alkylated toluene diamine (alkylated TDA) or alkylated methylene dianiline (alkylated MDA). The alkyl groups of these aromatic diamines are preferably of from 1 to about 20 carbon atoms, more preferably, 1 to about 6 carbon atoms.

The preferred alkylated TDA is a mixture of 3,5-diethyl-2,4 toluenediamine and 3,5-diethyl-2,6 toluenediamine (DETDA). Particularly useful is Ethacure 100LC, a low color version supplied by Albemarle, Inc. Other suitable alkylated aromatic diamines are listed in U.S. Pat. No. 4,631,298, such as, 2,4,6-triethyl-m-phenylenediamine (TEMPDA); 3,5-diisopropyl-2,4-diaminotoluene; 3,5-di-sec-butyl-2,6-diaminotoluene; 3-ethyl-5-isopropyl-2,4-diaminotoluene; 4,6-diisopropyl-m-phenylenediamine; 4,6-di-tert-butyl-m-phenylenediamine; 4,6-diethyl-m-phenylenediamine; 3-isopropyl-2,6-diaminotoluene; 5-isopropyl-2,4-diaminotoluene; 4-isopropyl-6-methyl-m-phenylenediamine; 4-isopropyl-6-tert-butyl-m-phenylenediamine; 4-ethyl-6-isopropyl-m-phenylenediamine; 4-methyl-6-tert-butyl-m-phenylenediamine; 4,6-di-sec-butyl-m-phenylenediamine; 4-ethyl-6-tert-butyl-m-phenylenediamine; 4-ethyl-6-sec-butyl-m-phenylenediamine; 4-ethyl-6-isobutyl-m-phenylenediamine; 4-isopropyl-6-isobutyl-m-phenylenediamine; 4-isopropyl-6-sec-butyl-m-phenylenediamine; 4-tert-butyl-6-isobutyl-m-phenylenediamine; 4-cyclopentyl-6-ethyl-m-phenylenediamine; 4-cyclohexyl-6-isopropyl-m-phenylenediamine; 4,6-dicyclopentyl-m-phenylenediamine; 2,2',6,6'-tetraethyl-4,4'-methylenebisaniline; 2,2',6,6'-tetraisopropyl-4,4'-methylenebisaniline (methylenebis diisopropylaniline); 2,2',6,6'-tetra-sec-butyl-4,4'-methylenebisaniline; 2,2'-dimethyl-6,6'-di-tert-butyl-4,4'-methylenebisaniline; 2,2'-di-tert-butyl-4,4'-methylenebisaniline; 2-isopropyl-2',6'-diethyl-4,4'-methylenebisaniline; and the like.

When MDI is employed instead of TDI, the alkylated TDA type chain extenders described above will give very short pot lives, suitable for RIM or LIM type systems. If longer pot lives are desired, such as for compression molding, hydroxy functional chain extenders or slower aromatic diamines can be used. Examples of suitable slower aromatic diamines include 4,4'-methylenebischloroaniline (MOCA), 4,4'-methylenebischloro-2,6-diethylaniline (MCDEA), dimethylthio-2,4-toluenediamine and dimethylthio-2,6-toluenediamine (DMTDA, commercially available as a mixture of these isomers), 1,3-propanediol bis-4,4'-aminobenzoate (PDPAB), polytetramethyleneoxidebis- 4,4'-aminobenzoate, 4-chloro-3,5-diaminobenzoic acid isobutyl ester, and the like.

More than one chain extender may be used in combination, or in combination with a high molecular weight polyol, provided they do not have a significant negative effect on the final product. The use of such combinations would permit the preparation of more than one hardness using the same prepolymer, which is advantageous to urethane processors, who routinely are required to manufacture several different hardnesses and can, thus, do so without switching prepolymers.

The isocyanate content of the prepolymer and the equivalent weight of the curative mixture govern the total amount of curative used. Generally, the ratio of equivalents of curative to equivalents of prepolymer, known as % theory, is about 60% to about 120%, preferably about 70% to about 110%.

Low cost polyurethane systems must also have reasonably low processing costs, which can be obtained by achieving low viscosities and fast cure times. E/PO prepolymers inherently have lower viscosities than PTMEG and PE prepolymers and low viscosities are needed to allow rapid mold filling and fast cure cycles. High temperatures can be used with the prepolymer of the present invention to reduce viscosities further. The addition of plasticizers to the formulation provides another method for reducing viscosities and cost of the system. At low viscosities and fast cure times, RIM or LIM type processing can be used, providing very low manufacturing cost.

Antioxidants are routinely used with E/PO to protect it from degradation and it has been found that the further addition of a hindered amine light stabilizer (HALS), especially in combination with a hindered UV stabilizer, such as, a benzotriazole or benzophenone can help prevent the yellowing of the elastomer, making it possible to produce color stable polyurethane covers that do not require painting with a white paint.

A typical process for producing the cast polyurethanes begins with premixing the ingredients into two stable, non-reactive components. This provides the simplest mixing operation at the time of casting the parts. Alternatively, more than two components can be simultaneously mixed at the time of casting. One example of a premixed, two component system is one that contains prepolymer on the "A" side, and DETDA, other curatives, HALS, UV stabilizers, and antioxidants on the "B" side. The "A" side is then heated to about 120–250° F., preferably about 150–212° F., to reduce the viscosity and accelerate the cure. The "B" side can be heated as well, to help speed the cure, but may also be kept at room temperature if no high viscosity or solid ingredients have been added. The prepolymer is then typically subjected to a vacuum to remove dissolved gasses that can cause bubbles in the final part. Optionally, the curative can also be degassed. The components are then mixed and poured into a preheated mold. The mold may already contain a core, as would be the case in RIM processing, or may have a core inserted into the curing mixture, as is the case in compression molding. The urethane covered ball thus formed remains in the mold until sufficiently cured for removal without deformation. Preferably, the mixing and dispensing is accomplished by a meter-mix machine. These parts are then either cured further in an oven or allowed to finish their cure at room temperature.

The advantages and the important features of the present invention will be more apparent from the following examples.

EXAMPLES

Example 1

Preparation of Golf Balls and Compression Buttons from a TDI-IPDI E/PO Prepolymer and DETDA A 55/65 blend of a 3200MW E/PO copolymer (Lyondell Acclaim 3205) and a 2000MW E/PO copolymer (Olin PolyG 55–56) was reacted with an excess of TDI 65 (65% 2,4, 35% 2,6 TDI, Mondur TDI from Bayer Corp.) in an 12 liter, three neck round bottom flask at 90° C. for 4 hours in the presence of 100 ppm of 85% phosphoric acid and standard polymer antioxidants. The NCO:OH ratio charged was 3:1. The resulting prepolymer was distilled to remove the free TDI in accordance with the procedure described in U.S. Pat. No. 4,182,825. A conventional, vertical, glass, wiped-film evaporator with an internal condenser and a heated jacket evaporative surface of 0.5 square foot was used. This vertical apparatus, essentially a column, was employed by feeding prepolymer in at the top. The prepolymer flowed downward by gravity and was wiped as a heated film on the inside of the column. The jacket temperature was 140° C. Vacuum was less than 0.04 torr. Volatile monomer evaporated from this film, then condensed to a liquid on an internal condenser located within the column. Internal condenser temperature was less than 15° C. Both distillate and residue continued flowing downward by gravity to receiver vessels. The resulting prepolymer residue had an isocyanate content (NCO content) of 2.80 wt %. The free TDI monomer content was less than 0.1 wt %. IPDI monomer was added to this prepolymer to bring the %NCO up to 7.2 wt %.

One hundred grams of this prepolymer was weighed into an open can, heated, and mixed on a hot plate to about 50° C., whereupon 14.5 grams of DETDA (Ethacure 100LC) was added and mixed vigorously for about 25 seconds. The mixture was poured into an open compression button mold and into the top half of a multi cavity golf ball mold that had been preheated to about 90° C. Another identical mix started 60 seconds later was poured into the bottom half of the golf ball mold. When the mixture in the top half of the mold had gelled sufficiently to hold a golf ball core, a core was pressed in. This top half was then inverted and mated with the bottom half, which was aided by alignment pins. After the bottom half had reached a gel state appropriate for compression molding, the two halves were pressed together in a press. After 10 minutes, the mold halves were separated and the balls were placed in a 100° C. oven for about one hour. They were then removed and allowed to cool to room temperature.

The compression buttons molded had a hardness of 95 shore A and an excellent resilience of 63%. Shear testing was conducted on the golf balls, as described below.

Example 2

Preparation of Golf Balls and Compression Buttons from a Low Free TDI E/PO Prepolymer and DETDA A 91.6/8.4% blend by weight of an E/PO polymer having a molecular weight of about 4000 (Lyondell Acclaim 4220) and DEG (diethylene glycol) was reacted with an excess of TDI 65 (3:1 NCO:OH) and distilled to remove free TDI, as in Example 1. The NCO content was 5.69 wt %. Golf ball covers and compression buttons were produced from this prepolymer and DETDA, as in Example 1, except that mold temperature was only 70° C. and no postcure was employed. The compression buttons molded had a hardness of 95 shore A and an excellent resilience of 63%. Shear testing was conducted on the golf balls, as described below.

Comparative Example A

Preparation of Golf Balls and Compression Buttons from a Low Free TDI PTMEG Prepolymer and DETDA/DMTDA Mixture Golf balls and compression buttons were produced from a 6% NCO low free TDI PTMEG prepolymer available from Uniroyal Chemical as Adiprene LF950A, cured with a 50/50 blend of DETDA and DMTDA (dimethylthio toluene diamine, Ethacure 300 from Albemarle Corp.). The procedure was the same as in Example 1, except that a higher temperature (65° C.) was needed for the prepolymer because of the higher viscosity inherent in PTMEG prepolymers. Also, this necessitated a curative blend including the more expensive and less color stable DMTDA to control the pot life, which would otherwise have been too fast, This composition closely mimics that of Example 1 in WO 98/37929. The compression buttons had a hardness of 95 shore A and a resilience of 51%. Shear testing was conducted on the golf balls, as described below.

Shear Testing of Golf Balls.

The golf balls of Example 1, Example 2, and Comparative Example A were tested side by side with commercial golf balls including two with PTMEG based polyurethane covers—the Titleist Professional and the Maxfi Revolution. Also tested were the Spalding Top Flite Strata, a Surlyn covered ball, and, as a control, the Titleist Tour Balata. All balls were hit by a golf professional with a pitching wedge with sharp grooves, and the contact points on the balls were marked. The speed of impact was about 89 mph and balls were hit from an artificial turf mat to prevent grass or other foreign matter from coming between the club and the ball and thereby skewing results. Damage to the balls was rated on a 1 to 10 scale, where 10 indicates a ball with absolutely no marks, indistinguishable from new, 5 indicates a ball with substantial damage to the surface of the cover (cutting), but no lost material, and 1 indicates a ball with a completely destroyed cover. With the commercial balls, one must be careful to rate damage to the cover itself and not damage to the paint layer on the surface.

The results are shown in Table 1.

TABLE 1

| Ball | Rating | Comments |
|---|---|---|
| Titleist Tour Balata | 4–5 | Control. Soft feel, but significant cover damage. |
| Titleist Professional | 6–7 | Polyurethane cover. |
| Spalding Top Flite Strata | 6–7 | Ionomer cover. |
| Maxfli Revolution | 8 | Polyurethane cover. |
| Example 1 | 9 | Excellent. |
| Example 2 | 6–7 | Good, may improve with longer cure time. |
| Comparative A | 9 | Excellent, but expensive and lower resilience, color stability. |

Example 3

Utilizing the procedure of Example 1, golf balls were produced from cores and a cover compound consisting of Vibrathane B875 (CK Witco Corporation) cured with butanediol at 95% theory. Vibrathane B875 is a prepolymer comprising 4,4 MDI, 2000 MW E/PO diol, and 4500 MW E/PO triol. Molds were preheated to 212° F. and the balls were allowed to cure for two hours before removing them and allowing them to cool. Shear resistance testing was conducted in accordance with "Second Round Shear Testing" below, and the results are shown in Table 2.

Example 4

Golf balls were produced utilizing the procedure of Example 3, except that molds were preheated to 70° C. and balls were cured for only 5–10 min before demolding and allowing to cool. Golf balls were produced from cores and a cover compound comprising Vibrathane B875 cured with a mixture of 15 mole % of a 2000 MW E/PO polyol and 85 mole % of PDPAB at 95% theory. Shear resistance testing was conducted in accordance with "Second Round Shear Testing" below, and the results are shown in Table 2.

Comparative Example B

A 6.3% NCO prepolymer was produced from MDI and 2000 MW PTMEG. Golf balls were produced utilizing the procedure of Example 4, from cores and a cover compound comprising this prepolymer cured with DMTDA at 95% theory. Shear resistance testing was conducted in accordance with "Second Round Shear Testing" below, and the results are shown in Table 2.

Example 5

A 6.45% NCO prepolymer was produced from MDI and a 4000 MW E/PO diol. Utilizing the procedure of Example 4, golf balls were produced from cores and a cover compound comprising this prepolymer cured with DMTDA at 95% theory. Shear resistance testing was conducted in accordance with "Second Round Shear Testing" below, and the results are shown in Table 2.

Example 6

A 6.58% NCO prepolymer was produced from MDI and a 6000 MW E/PO triol. Utilizing the procedure of Example 4, golf balls were produced from cores and a cover compound comprising this prepolymer cured with DMTDA at 95% theory. Shear resistance testing was conducted in accordance with "Second Round Shear Testing" below, and the results are shown in Table 2.

Example 7

Following the procedure of Example 2, additional prepolymer was produced for use on a meter-mix machine. The prepolymer had a % NCO of 5.73. Prepolymer and curative (DETDA) were fed to a dynamic mix head of an Edge-Sweets meter-mix machine via precision metering gear pumps, at a ratio of 95% theory. The components were thoroughly mixed in the head and discharged into one half of the mold. Cores were inserted, material poured into the second half, and the two halves pressed together in the same manner as described in Example 1. The mold had been preheated to 70° C., and the golf balls were demolded and allowed to cool after 5–10 minutes. Shear resistance testing was conducted in accordance with "Second Round Shear Testing" below, and the results are shown in Table 2.

Example 8

Example 7 was repeated except that the mix ratio was changed to 80% theory. Shear resistance testing was conducted in accordance with "Second Round Shear Testing" below, and the results are shown in Table 2.

Additional Testing of Comparative Example A, Examples 1 and 2, and Comparative Commercial Golf Balls Shear resistance testing was repeated on Comparative Example A, Example 1, Example 2, the Spalding Topflite XL, and the Titleist Tour Balata, respectively, in accordance with "Second Round Shear Testing" below, and the results are shown in Table 2.

Second Round Shear Testing

Golf balls were tested by a golf professional hitting from an artificial turf mat with a sand wedge at about 89 mph. The wedge had deep, sharp grooves about 80 mils wide cut in the face, and this test was intended to be more severe than the original test. Golf balls were rated for damage as before. Results again indicate that the lower cost E/PO based urethane covers perform as well as, or better than, PTMEG based urethane covers, ionomer covers, and balata covers.

TABLE 2

| Ball | Rating | Comments |
|---|---|---|
| Titleist Tour Balata | 5 | Clearly worse than urethane |
| Spalding Top Flite XL | 3 | Some cover material sheared off |
| Example 1 | 8–9 | |
| Example 2 | 7 | |
| Example 3 | 6–8 | Damage less consistent than the rest |
| Example 4 | 7 | |
| Comparative B | 6–7 | PTMEG |
| Example 5 | 6–7 | |
| Example 6 | 7 | |
| Example 7 | 7 | Machine cast |
| Example 8 | 8 | Machine cast |

Example 9

A polypropylene oxide homopolymer having a molecular weight of 2000 was reacted with an excess of TDI 65 and distilled to remove free TDI, as in Example 1. The NCO content was 3.41%. Golf balls and compression buttons were produced from this prepolymer and DETDA, as in Example 1. The hardness was 75 Shore A, and the resilience was 60%. Shear testing was conducted as in Example 1, and is tabulated in Table 3.

Example 10

Golf balls and compression buttons were produced from the prepolymer of Example 9 and MCDEA (4,4' methylenebis(3-chloro 2,6 diethylaniline), as in Example 1. The hardness was 89 Shore A, and the resilience was 60%. Shear testing was conducted as in Example 1, and is tabulated in Table 3.

Example 11

IPDI (12%) was added to 88% of the prepolymer of Example 9 to produce a prepolymer with 7.16% NCO. Golf balls and compression buttons were produced from this prepolymer and DETDA, as in Example 1. The hardness was 97 Shore A, and the resilience was 61%. Shear testing was conducted as in Example 1, and is tabulated in Table 3.

Example 12

A 68.7/30.6/0.7 blend by weight of a 4000 molecular weight PC homopolymer, a 2000 molecular weight PG homopolymer, and DEG (diethylene glycol) was reacted with an excess of TDI 65 and distilled to remove free TDI, as in Example 1. The prepolymer had an NCO content of 2.70%. Golf balls and compression buttons were produced from this prepolymer and DETDA, as in Example 1. The hardness was 67 Shore A, and the resilience was 65%. Shear testing was conducted as in Example 1, and is tabulated in Table 3.

Example 13

Golf balls and compression buttons were produced from the prepolymer of Example 12 and MCDEA, as in Example 1. The hardness was 87 Shore A, and the resilience was 64%. Shear testing was conducted as in Example 1, and is tabulated in Table 3.

Comparative Example C

Golf balls and compression buttons were produced from Vibrathane B-836, an MDI-PTMEG prepolymer with 8.95% NCO, and Polamine 250 (polytetramethyleneoxide di-p-aminobenzoate, Air Products and Chemicals), as in Example 1. This system is used in Example 1 of U.S. Pat. No. 5,334,673. The hardness was 97 Shore A, and the resilience was 53%, lower than any of the examples of the present invention. Shear testing was conducted as in Example 1, and is tabulated in Table 3.

Comparative Examples D, E, and F

Commercial golf balls were tested for shear resistance along with the golf balls of this invention, for comparative purposes. The shear resistance of these balls was lower, and is tabulated in Table 3.

TABLE 3

Shear resistance was measured in the same manner as in the "Second Round Shear Testing". Results were as follows:

| Ball | Shear Rating | Hardness | Resilience |
|---|---|---|---|
| Example 9 | 8–9 | 75A | 60 |
| Example 10 | 8–9 | 89A | 60 |
| Example 11 | 8 | 97A | 61 |
| Example 12 | 9+ | 67A | 65 |
| Example 13 | 9+ | 87A | 64 |
| Comparative C | 7 | 97A | 53 |
| Top Flite XL2000 | 3 | — | — |
| Titleist Tour Balata | 5 | — | — |
| Titleist Tour Prestige | 6–7 | — | — |

Note: The Titleist Tour Prestige has a polyurethane cover, and is believed to be made according to U.S. Pat. No. 5,334,673, as was Comparative Example C.

Greater resilience indicates less energy lost. This will result in greater distance when the golf ball is hit. Thus, the golf balls of this invention have greater distance and durability, while having lower cost. This is because PO homopolymers and EO-PO copolymers are inherently less expensive than PTMEG Also, DETDA is inherently less expensive than the slow reacting curatives of U.S. Pat. No. 5,334,673.

In view of the many changes and modifications that can be made without departing from principles underlying the invention, reference should be made to the appended claims for an understanding of the scope of the protection to be afforded the invention.

What is claimed is:

1. A golf ball comprising a core and a cover, said cover comprising a polyurethane elastomer comprising the reaction product of:

A) at least one diisocyanate monomer selected from the group consisting of toluene-2,4-diisocyanate and toluene-2,6-diisocyanate;

B) at least one polyol that is a homopolymer of propylene oxide having a number average molecular weight in the range of from 1000 to 20,000 and, optionally, at least one glycol or triol having a molecular weight in the range of from 60 to 250; and C) at least one amine functional chain extender selected from the group consisting of DETDA and MCDEA;

wherein the ratio of equivalents of C) plus B) to equivalents of A) is in the range of from about 0.6:1 to about 1.2:1.

2. The golf ball of claim 1 wherein the chain extender is DETDA.

3. The golf ball of claim 1 wherein the cover further comprises at least one antioxidant, UV stabilizer, or light stabilizer to improve color stability.

4. A method of making a golf ball comprising a core and a polyurethane elastomer cover comprising molding around a pre-made core the reaction product of:

A) at least one diisocyanate monomer selected from the group consisting of toluene-2,4-diisocyanate and toluene-2,6-diisocyanate;

B) at least one polyol that is a homopolymer of propylene oxide having a number average molecular weight in the range of from 1000 to 20,000 and, optionally, at least one glycol or triol having a molecular weight in the range of from 60 to 250; and C) at least one amine functional chain extender selected from the group consisting of DETDA and MCDEA;

wherein the ratio of equivalents of C) plus B) to equivalents of A) is in the range of from about 0.6:1 to about 1.2:1.

5. The method of claim 4 wherein the chain extender is DETDA.

6. The method of claim 4 wherein the cover further comprises at least one antioxidant, UV stabilizer, or light stabilizer to improve color stability.

* * * * *